United States Patent
Miyazaki et al.

(10) Patent No.: US 6,215,566 B1
(45) Date of Patent: Apr. 10, 2001

(54) MULTI-WAVELENGTH LIGHT SOURCE AND DISCRETE-WAVELENGTH-VARIABLE LIGHT SOURCE

(75) Inventors: Tetsuya Miyazaki; Noboru Edagawa; Shu Yamamoto, all of Tokyo (JP)

(73) Assignee: Kokusai Denshin Denwa Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/625,387

(22) Filed: Jul. 26, 2000

Related U.S. Application Data

(62) Division of application No. 08/932,222, filed on Sep. 17, 1997.

(30) Foreign Application Priority Data

Sep. 17, 1996 (JP) .................................................. 8-244383

(51) Int. Cl.[7] .................................................. H04J 14/06
(52) U.S. Cl. .................. 359/122; 359/127; 359/156; 359/180; 359/187; 359/188
(58) Field of Search ................... 359/122, 127, 359/180, 187, 188, 156

(56) References Cited

U.S. PATENT DOCUMENTS

| 4,890,893 | * | 1/1990 | Smoot | 350/96.15 |
|---|---|---|---|---|
| 5,019,826 | * | 5/1991 | de La Chapelle et al. | 342/202 |
| 5,153,933 | * | 10/1992 | smith et al. | 385/27 |
| 5,265,112 | * | 11/1993 | Noll et al. | 372/32 |
| 5,416,865 | * | 5/1995 | Fielding | 385/32 |
| 5,452,116 | * | 9/1995 | Kirkby et al. | 359/124 |
| 5,801,879 | * | 9/1998 | Burton et al. | 359/341 |

* cited by examiner

Primary Examiner—Leslie Pascal
Assistant Examiner—Hanh Phan
(74) Attorney, Agent, or Firm—Christie, Parker & Hale, LLP

(57) ABSTRACT

In a light source for generating light containing multiple wavelengths substantially uniform in intensity, a wavelength demultiplexing element 10 (for example, waveguide-type wavelength selecting filter) demultiplexes input light into a plurality of wavelengths $\lambda 1$ through $\lambda 32$. Optical amplifiers 14-1 through 14-32 amplify outputs of the element 10 and applies them to input ports of a wavelength multiplexing element 12. The wavelength multiplexing element 12 wavelength-multiplexes their input. Output of the wavelength multiplexing element 12 is applied to a fiber coupler 16 which, in turn, applies one of its outputs to the wavelength demultiplexing element 10. The optical amplifiers 14 have a gain larger by approximately 10 dB than the loss in the optical loop made of the element 10, optical amplifier 14, element 12 and fiber coupler 16. The other output of the fiber coupler 16 is wavelength-multiplex light containing wavelengths $\lambda 1$ through $\lambda 32$.

5 Claims, 15 Drawing Sheets

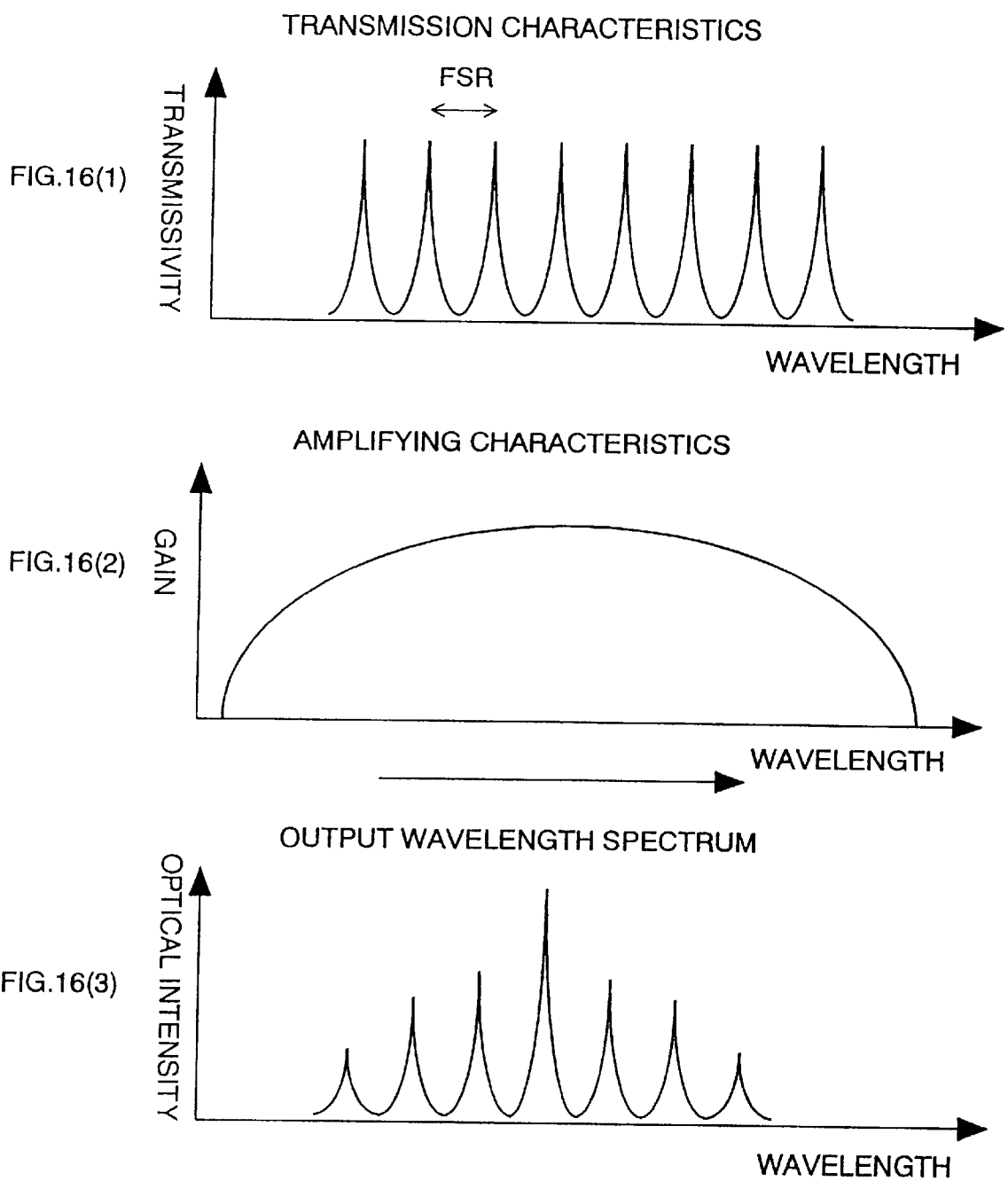

MULTI-WAVELENGTH LIGHT SOURCE AND DISCRETE-WAVELENGTH-VARIABLE LIGHT SOURCE

CROSS-REFERENCE TO RELATED APPLICATIONS

The present application is a division of co-pending application, Ser. No. 08/932,222, filed Sep. 17, 1997.

FIELD OF THE INVENTION

This invention relates to a multi-wavelength light source and a discrete-wavelength-variable light source, and more particularly, to a multi-wavelength light source for supplying one or more optical outputs with different wavelengths concurrently or selectively and a discrete-wavelength-variable light source capable of selecting one of a plural of wavelengths, which are suitable for transmission or tests of a wavelength division/multiplex transmission system.

BACKGROUND OF THE INVENTION

In wavelength division multiplex transmission systems, it is essential to reliably obtain laser lights with a number of close wavelengths. For transmission tests or tests of optical components used in wavelength division/multiplex transmission systems, there is the need for a laser light source highly stable in wavelengths and outputs.

ITU has recommended 0.8 nm (100 GHz) as the wavelength interval in wavelength division multiplex transmission systems. While temperature coefficients of wavelength changes of semiconductor lasers are approximately 0.1 nm/° C. That is, semiconductor lasers are very sensitive to temperature fluctuation. Therefore, it is difficult to maintain wavelength intervals of 0.8 nm in a number of semiconductor laser light sources over a long period. Moreover, in ordinary laser sources, injected current is used to stabilize optical outputs. Control current for stabilization of optical outputs causes changes in temperature, and it results in changes in wavelength. That is, control of optical outputs affects wavelengths, and makes it difficult to stabilize wavelengths.

A prior proposal to cope with the problem is to connect an optical filter and an optically amplifying element in a ring to form a multi-wavelength light source for collectively supplying multiple wavelengths. FIG. 15 is a schematic block diagram showing a prior example A Fabry-Perot optical filter 210, erbium-doped optical fiber amplifier 212 and optical fiber coupler 214 are connected to form a ring.

FIG. 16 show characteristic diagrams of the prior example of FIG. 15. FIG. 16(1) shows transparent wavelength characteristics of the Fabry-Perot optical filter 210, FIG. 16(2) shows amplifying characteristics of the optical fiber amplifier 212, and FIG. 16(3) shows the spectral waveform of output wavelength. The Fabry-Perot optical filter 210 is a kind of wavelength selecting optical filters having wavelength transparent characteristics which permit specific wavelengths in certain wavelength intervals called FSR (Free Spectral Range) to pass through as shown in FIG. 16(1). Individual transparent wavelengths of the Fabry-Perot optical filter 210 are selected from the spontaneous emission light generated in the optical fiber amplifier 212. The output spectral waveform coincides with that obtained by multiplying the transparent wavelength characteristics of the optical filter 210 by the amplifying characteristics of the optical fiber amplifier 212. Theoretically, laser oscillation outputs are obtained in wavelengths where the gain of the optical fiber amplifier 212 surpasses the loss of the optical loop.

In the prior art example shown in FIG. 15, the output intensity is large near the gain center wavelength within the amplifying range of the optical fiber amplifier 212, where oscillation is most liable to occur, and largely decreases in peripheral portions, as shown in FIG. 16(3). That is, the prior art example cannot realize simultaneous oscillation in multiple wavelengths in substantially uniform output levels.

Moreover, wavelength interval in output light in the prior art example exclusively depends on transparent characteristics of the Fabry-Perot optical filter 210. When the wavelength interval is 0.8 nm (100 GHz), the wavelength interval FSR of the transparent wavelength characteristics of the Fabry-Perot optical filter 210 is less than the uniform extension width of the erbium-doped optical fiber amplifier 212. Therefore, even when a plurality of oscillation wavelengths are obtained near the gain center wavelength of the erbium-doped optical fiber amplifier 212, mode competition occurs, and results in unstable output intensities and wavelength fluctuations of respective wavelengths.

A Fabry-Perot semiconductor lasers is a multi-wavelength light source, other than the fiber ring light source. However, it involves unacceptable fluctuations in oscillation wavelengths due to mode competition or mode hopping, and fails to uniform intensities of respective oscillated wavelength components.

SUMMARY OF THE INVENTION

It is therefore an object of the invention to provide a multi-wavelength light source and a discrete-wavelength-variable light source capable of simultaneously or selectively outputting one or more wavelengths with a uniform intensity.

Another object of the invention is to provide a multi-wavelength light source capable of selecting one or more wavelengths among a plurality of wavelengths.

Another object of the invention is to provide a multi-wavelength light source and a discrete-wavelength-variable light source immune to temperature fluctuations.

The invention uses a wavelength demultiplex/amplify/multiplexing unit for demultiplexing input light into a plurality of different predetermined wavelengths, optically amplifying individual wavelengths, and multiplexing the wavelengths, and connects its output to its input to form an optical loop. Since individual wavelengths are optically amplified by the wavelength demultiplex/amplify/multiplexing unit, laser oscillation in a plurality of wavelengths with substantially the same intensity is promised in the optical loop. Since the structure is simple and the most elements are passive ones, it is highly stable against temperature fluctuations.

When using wavelength demultiplexing means for demultiplexing input light into a plurality of predetermined wavelengths in predetermined wavelength intervals, the light containing multiple wavelengths in substantially constant wavelength intervals can be obtained. Usable as the wavelength demultiplexing means is a waveguide-type wavelength selecting filter, for example.

When using the optical band pass filter means which is transparent only to light within a predetermined wavelength band, the light source can prevent that light beyond the desired wavelength band circulates in the optical loop. This contributes not only to stabilization of laser oscillation but also to reliably preventing that the output contains undesirable wavelengths.

By using optical modulation means for intensity-modulating circulating flight in the optical loop with a modulation signal having a frequency, which is an integer multiple of the circulation frequency (namely, c/nL) in the optical loop, the light source can conjoin multiple-wavelength light into pulsating light synchronous with the modulation signal. Location of the optical modulation means may be either posterior to wavelength division or posterior to wavelength multiplexing. When it is located after wavelength division, fine adjustment of individual wavelengths,is easier, but a plurality of optical modulating means for individual wavelengths must be used. When it is located after wavelength multiplexing, optical modulating means may be only one, but adjustment of individual wavelengths must be done in another portion. Polarization adjusting means may be provided in the input side of the optical modulating means to previously adjust polarization so as to ensure optimum operations of the optical modulating means. If, of course, necessary means is of a polarization holding type, polarization adjusting means may be omitted to reduce elements.

When individual optically amplifying means are capable of selectively supplying or blocking outputs to the wavelength multiplexing means, multiplex output light containing one or more selected wavelengths can be obtained. If each of the optically amplifying means comprises an optical amplifier for amplifying corresponding one of optical outputs from the wavelength demultiplexing means and an optical switch means for feeding or blocking the optical output of the optical amplifier, undesired noise light is prevented from entering into the wavelength multiplexing means while the optical switch means blocks the path.

In another aspect of the invention, an output of wavelength demultiplex/amplify/multiplexing means for demultiplexing input light into a plurality of predetermined wavelengths, then optically amplifying them individually, and thereafter multiplexing them is connected to the input of the same wavelength demultiplex/amplify/multiplexing means via polarization means, optical dividing means and depolarization means to form an optical loop. There is also provided modulation means for modulating divisional optical outputs from the optical dividing means in accordance with a modulation signal.

With this arrangement, light components with multiple wavelengths which are simultaneously oscillated in the optical loop can be modulated collectively by the modulation means.

Since the polarization means suppresses fluctuations in plane of polarization, fluctuations in the ring cavity mode are less likely to occur, and simultaneous oscillation in multiple wavelengths is stabilized. Since the polarization adjusting means in an appropriate location selects and maintains an appropriate plane of polarization for each element, behaviors of individual elements are stabilized. If essential means are of a polarization holding type, polarization means and polarization adjusting means may be omitted to reduce elements.

In another aspect of the invention, an output of wavelength demultiplex/amplify/multiplexing means for demultiplexing input light into a plurality of predetermined wavelengths, then optically amplifying them individually, and thereafter multiplexing them is connected to the input of the same wavelength demultiplex/amplify/multiplexing means to form an optical loop and wavelength shifting means is provided in the optical loop to slightly shift the wavelengths. As a result, laser oscillation is suppressed, and an ASE (Amplified Spontaneous emission) light source for multiple wavelengths can be realized.

Since the polarization adjusting means and depolarization means in appropriate locations select and maintain an appropriate plane of polarization for each element, behaviors of individual elements are stabilized. By taking out the light from the optical loop after depolarization, output light independent from or less dependent on polarization can be obtained. If essential means are of a polarization holding type, polarization adjusting means may be omitted to reduce elements.

In another aspect of the invention, an optical loop is formed such as demultiplexing input light into a plurality of predetermined wavelengths, then optically amplifying them individually, thereafter multiplexing them and feedback to the input, and it is activated for simultaneous oscillation in multiple wavelengths. Lights which are wavelength-demultiplexed and individually amplified are divided, individually modulated outside and thereafter wavelength-multiplexed. As a result, multi-wavelength light containing individually modified wavelengths can be obtained.

In another version of the invention, an output of selective-demultiplex/amplifying means for selectively demultiplexing a predetermined wavelength from input light and optically amplifying it is connected to the input of the selective-demultiplex/amplifying means to form an optical loop. Thus, a single wavelength selected by the selective-demultiplex/amplifying means can be supplied as output light. That is, any one of a plurality of discrete wavelengths can be selected. Since it is selected from predetermined wavelengths, output with a stable wavelength can be obtained. Since the polarization adjusting means in an appropriate location selects and maintains an appropriate plane of polarization for each element, behaviors of individual elements are stabilized. If essential means are of a polarization holding type, polarization adjusting means may be omitted to reduce elements.

DESCRIPTION OF THE DRAWINGS

FIG. 16 is a characteristics diagram of the conventional light source shown in FIG. 15.

DETAILED DESCRIPTION OF THE INVENTION

Embodiments of the invention are explained in detail with reference to the drawings.

Figure 1:
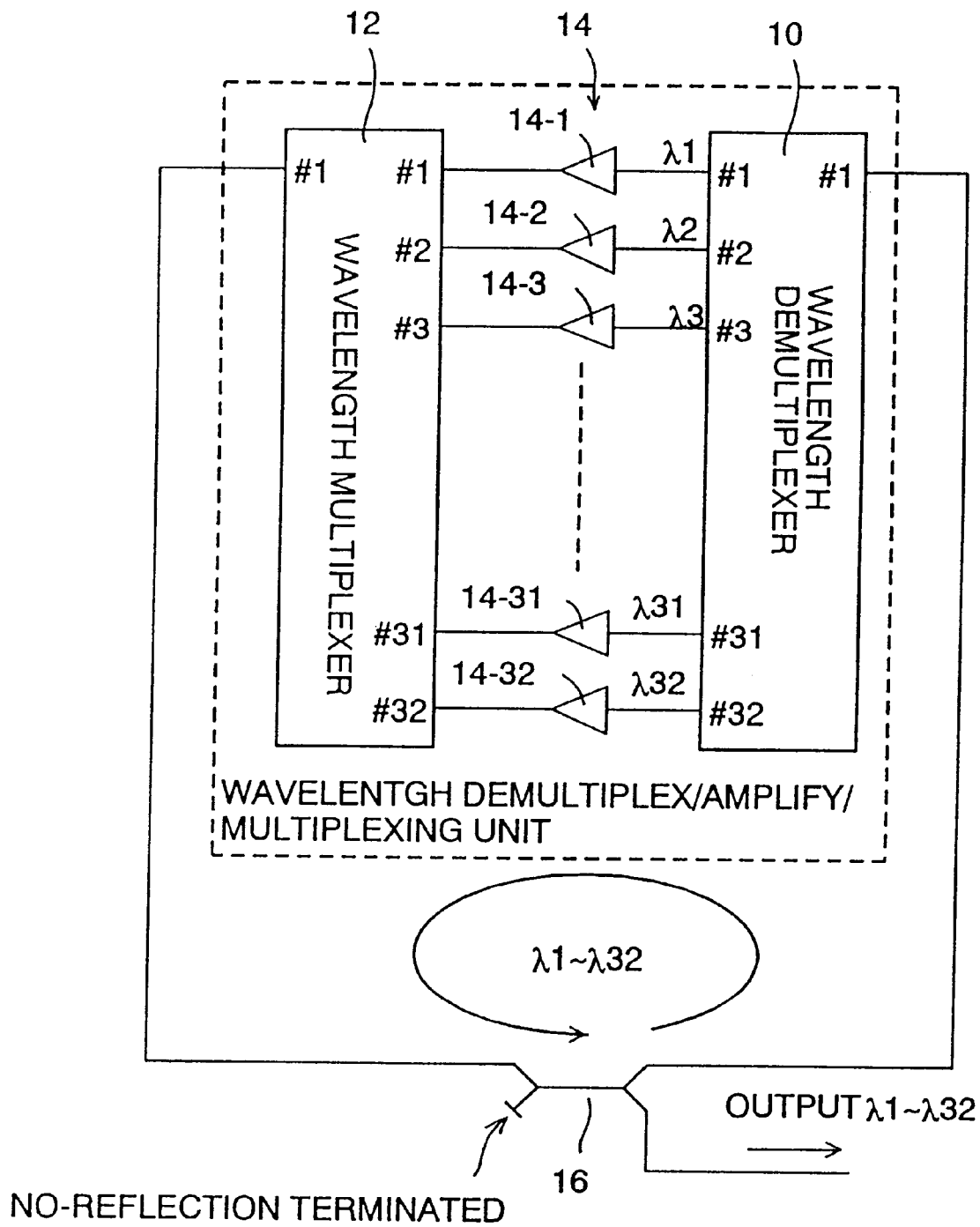
FIG. 1 is a schematic block diagram showing a general construction of a first embodiment of the invention.
Figure 2:
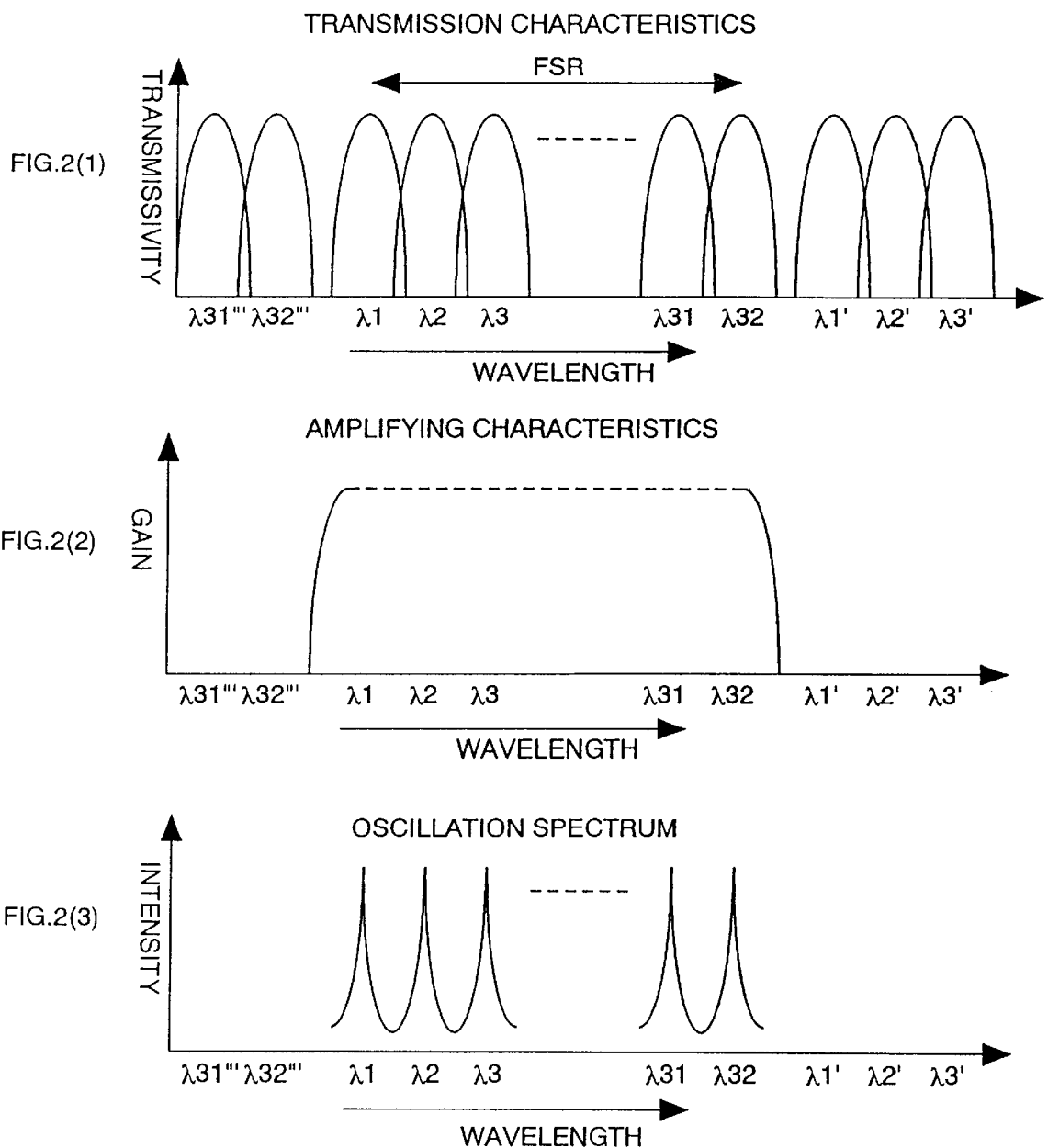
FIG. 2 shows waveform characteristics of the same embodiment.

FIG. 1 is a schematic block diagram showing a general construction of a first embodiment of the invention. FIG. 2 shows wavelength characteristics of this embodiment.

In FIG. 1, reference numeral 10 denotes a wavelength demultiplexing element for demultiplexing input light through an input port #1 into a plurality of predetermined wavelength components (in this embodiment, components of wavelengths $\lambda 1$ to $\lambda 32$). Numeral 12 denotes a wavelength multiplexing element for wavelength-multiplexing the light components with multiple wavelengths (in this embodiment, wavelengths $\lambda 1$ to $\lambda 32$). Namely, these elements are waveguide-type wavelength selecting filters (AWG). Other than AWG, known as another optical element for demultiplexing and multiplexing a plurality of wavelengths collectively is the optical demultiplex/multiplexing filter developed by Optical Corporation of America, U.S.A. Also this type of optical element can be used as the wavelength demultiplexing element 10 and the wavelength multiplexing element 12.

Output ports #1 through #32 of the wavelength demultiplexing element 10 are connected to input ports #1 through #32 of the wavelength multiplexing element 12 via optical amplifiers 14 (14-1 through 14-32). Output port #1 of the wavelength multiplexing element 12 is connected to a fiber coupler 16, and one of two outputs of the fiber coupler 16 is connected to input port #1 of the wavelength demultiplexing element 10. Thus, the other output of the fiber coupler 16 is extracted as desired multi-wavelength light. The unused output end of the fiber coupler 16 is made as a non-reflective end. As a result, instable oscillation by Fresnel reflection can be prevented. The same also applies to all embodiments shown below.

Each optical amplifier 14 includes an erbium-doped optical fiber amplifier, pumping light source and wavelength demultiplex/multiplexing (WDM) coupler for supplying output light from the pumping light source to the optical fiber amplifier. The optical amplifier 14 may be made of a semiconductor laser amplifier and a Raman amplifier.

Briefly explained below are functions of AWG used as the wavelength demultiplexing element 10 and the wavelength multiplexing element 12. AWG is an optical element in which wavelengths $\lambda 1$ through $\lambda 32$ entering in the input port #1 are output from output ports #1 through #32, and wavelengths $\lambda 1$ through $\lambda 32$ entering in the input port #2 are output from output ports #2 through #32 and #1. Those entering in the subsequent ports are output from output ports with corresponding and subsequent numbers, and wavelengths $\lambda 1$ through $\lambda 32$ entering in the input port #32 are output from output ports #32 and #1 to #31. Wavelength intervals of wavelengths $\lambda 1$ through $\lambda 32$ are determined by the inner interference structure. Therefore, when wavelength-division multiplexed light containing wavelengths $\lambda 1$ through $\lambda 32$ enters in the input ports #1, these wavelengths $\lambda 1$ through $\lambda 32$ are wavelength-demultiplexed and output from corresponding output ports #1 through #32. In contrast, when lights of wavelengths $\lambda 1$ through $\lambda 32$ enter in respective corresponding input ports #1 through #32, wavelength-multiplexed light containing the entered wavelengths $\lambda 1$ through $\lambda 32$ is output from the output port #1.

AWGs have a periodicity, and these wavelengths $\lambda 1$ through $\lambda 32$ are so-called basic waves. Also longer wavelengths $\lambda 1'$ through $\lambda 32'$ and shorter wavelengths $\lambda 31'''$ and $\lambda 32'''$ are wavelength-demultiplexed and wavelength-multiplexed.

FIG. 2 (1) shows composite transparent wavelength characteristics obtained when output ports of the wavelength demultiplexing element 10 are connected to common-numbered input ports of the wavelength multiplexing element 12, respectively. In this embodiment, in which the wavelength demultiplexing element 10 and the wavelength multiplexing element 12 are 32×32 type AWGs, the transparent wavelength characteristics are periodic, and 32 wavelengths form one cycle, as explained above. In general, this is defined as FSR (Free Spectral Range) of AWG. There are wavelengths $\lambda 1', \lambda 2', \ldots$ and $\ldots, \lambda 31'''$ and $\lambda 32'''$ outside $\lambda 1$ through $\lambda 32$ used in the embodiment, as shown in FIG. 2(1). For example, $\lambda 1'$ and $\lambda 32'''$ entering in the input port #1 of the wavelength demultiplexing element 10 are output from output ports #1 and #32.

If the composite transparent wavelength characteristics of the wavelength demultiplexing element 10 and the wavelength multiplexing element 12 are such that the transparent wavelength width for each wavelength is sufficiently narrow, longitudinal modes of ring resonance, described later, can be decreased to a few or only one. This is attained by narrowing the transparent wavelength width of each wavelength in the transparent wavelength characteristics of the wavelength demultiplexing element 10 and the wavelength multiplexing element 12, respectively, or by slightly shifting the transparent wavelength characteristics of the wavelength demultiplexing element 10 from those of the wavelength multiplexing element 12. The latter is advantageous for obtaining a desired wavelength width more easily although the loss is larger.

Ideally, each of the optical amplifiers 14-1 through 14-32 has amplifying wavelength characteristics covering one cycle of FSR, namely, the wavelength range of $\lambda 1$ through $\lambda 32$, and preferably exhibiting a drastic decrease in gain beyond the range. Actually, in accordance with the amplifying wavelength characteristics of available optical amplifiers, AWGs having FSRs consistent with the amplifying wavelength characteristics are used as the wavelength demultiplexing element 10 and the wavelength multiplexing element 12. The gain of amplification by each optical amplifier 14 is determined larger by approximately 10 dB than the loss in one circulation of the loop made of the wavelength demultiplexing g element 10, optical amplifier 14, wavelength multiplexing element 12 and fiber coupler 16.

Basically, it is sufficient for each of the optical amplifiers 14-1 through 14-32 that its gain center wavelength can cover a single wavelength assigned to it. However, the use of different optical amplifiers with different gain center wavelengths makes the process of producing and assembling respective element more troublesome, and it is preferable to use optical amplifiers 14-1 to 14-32 with the same amplifying wavelength range. From this point of view, the amplifying wavelength characteristics in which the gain is flat throughout one cycle, namely one FSR OF AWGs 10 AND 12, and drastically decreases outside this range is preferable.

Due to the composite transparent wavelength characteristics of the wavelength demultiplexing element 10 and the wavelength multiplexing element 12 (FIG. 2(1)) and the amplifying wavelength characteristics of the optical amplifiers 14-1 through 14-32 (FIG. 2(2)), the loop gain of the embodiment shown in FIG. 1 draws peaks at wavelengths $\lambda 1, \ldots \lambda 32$, and light output from the fiber coupler 16 to the exterior of the optical loop results in the spectrum shown in FIG. 2(3). Since the wavelength demultiplexing element 10 and the wavelength multiplexing element 12 have the same transparent center wavelength and uniform transmissivity to respective wavelengths, and the optical amplifiers 14-1 through 14-32 have substantially the same gain, respective wavelengths $\lambda 1$ to $\lambda 32$ in output light extracted by the fiber coupler 16 have substantially the same optical intensity. In AWG, variance in loss among different wavelengths upon wavelength division and wavelength multiplexing can be readily reduced to 3 through 4 dB or less in the process of fabrication, and this degree of variance can be compensated by fine adjustment of amplification gains of respective optical amplifiers 14-1 thorough 14-32.

Since each optical amplifier 14-1 to 14-32 amplifies a single wavelength alone, mode competition does not occur, and stable amplification of input light is promised. Therefore, this embodiment can realize multi-wavelength oscillation in wavelengths $\lambda 1$ to $\lambda 32$, and can substantially equalize intensities of respective wavelengths.

It is no problem, provided that one of the wavelength demultiplexing element 10 and the wavelength multiplexing element 12, preferably the wavelength demultiplexing element 10, does not have a wavelength periodicity. However, under the conditions where the wavelength demultiplexing element 10 (and the wavelength multiplexing element 12) has a wavelength periodicity, and FSR of the wavelength demultiplexing characteristics is narrower than the amplification band of the optical amplifiers 14, which results in containing two FSRs in the amplification band of the optical amplifiers 14, the loop gain happens to exist also for wavelengths outside $\lambda 1$ to $\lambda 32$, e.g. wavelengths $\lambda 1'$ and $\lambda 32'''$, and possibly causes mode competition or instable oscillation.

Figure 3:
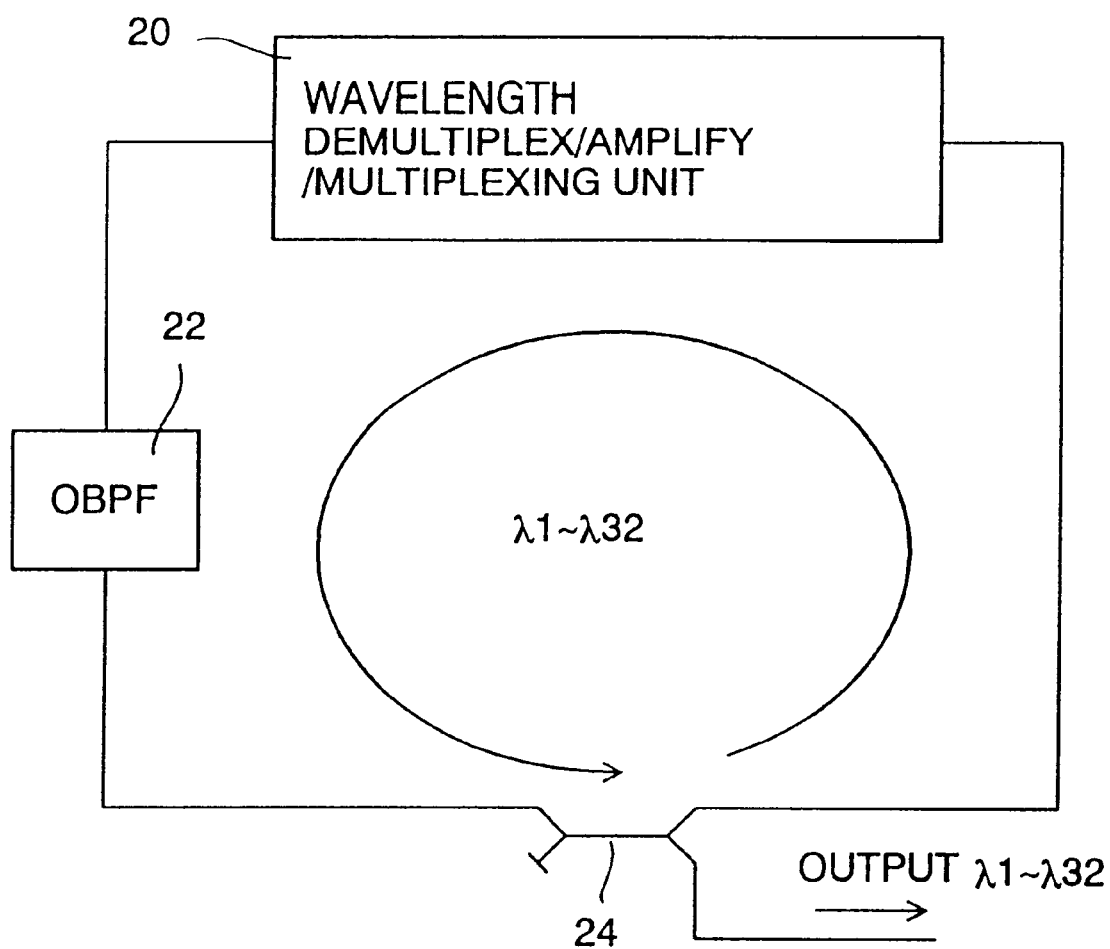
FIG. 3 is a schematic block diagram of a general construction of a modified embodiment.

This can be prevented by locating an optical band pass filter in the loop to pass wavelengths $\lambda 1$ to $\lambda 32$ alone. FIG. 3 is a schematic block diagram showing a general construction of another embodiment taken for this purpose. Reference numeral 20 denotes a wavelength demultiplex/amplify/multiplexing unit containing the wavelength demultiplexing element 10, wavelength multiplexing element 12 and optical amplifiers 14 of FIG. 1. Numeral 22 denotes an optical band pass filter (optical BPF) transparent to wavelengths $\lambda 1$ through $\lambda 32$ alone in output light from the wavelength demultiplex/amplify/multiplexing unit 20. Numeral 24 denotes a fiber coupler which demultiplexes output light of the optical BPF 22 into two components, and supplies one to the wavelength demultiplex/amplify/multiplexing unit 20 and extracts the other as multi-wavelength output.

Figure 4:
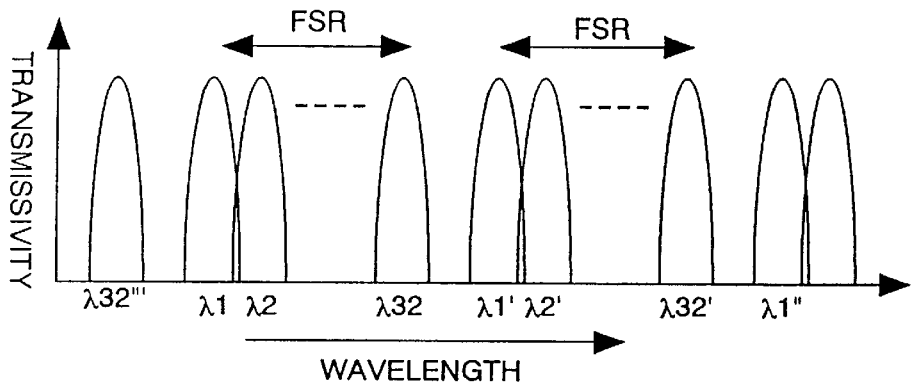
FIG. 4 shows waveform diagrams of a version using AWGs as a wavelength demultiplexing element 10 and a wavelength multiplexing element 12, and containing two FSRs of these AWGs in the band of amplification of the optical amplifier 14.
Figure 4:
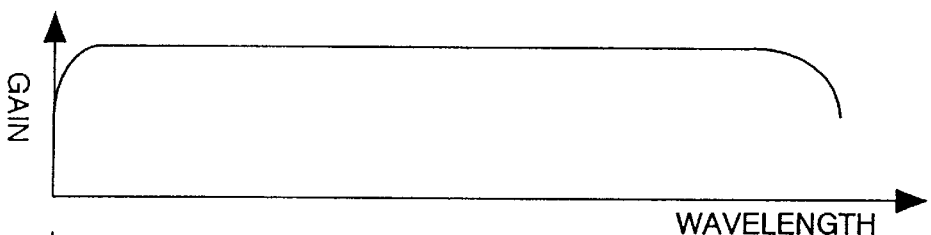
Figure 4:
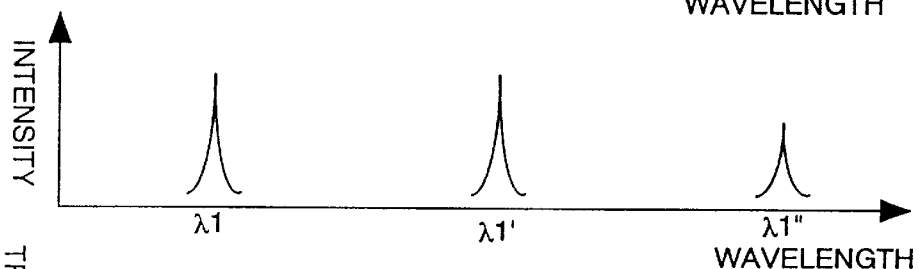
Figure 4:
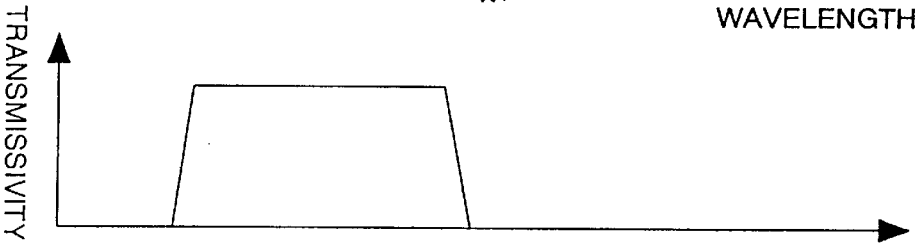
Figure 4:
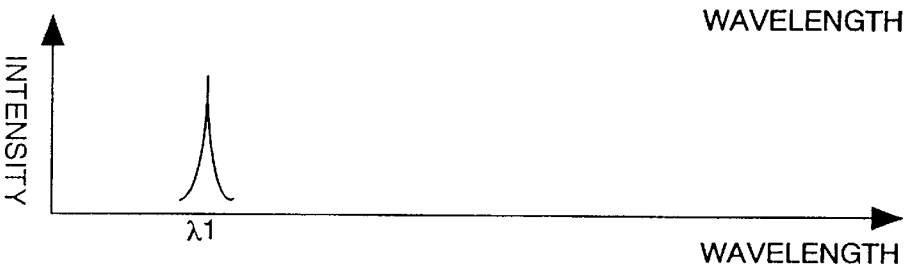

FIG. 4 shows waveforms of a version using AWGs as the wavelength demultiplexing element 10 and the wavelength multiplexing element 12, and containing two FSRs of AWGs in the amplification band of the optical amplifiers 14. FIG. 4(1) shows transparent wavelength characteristics of AWGs used as the wavelength demultiplexing element 10 and the wavelength multiplexing element 12. FIG. 4(2) shows amplification characteristics of the optical amplifiers 14. FIG. 4(3) shows wavelength characteristics of light passing through the optical amplifier 14-1 when the optical BPF 22 is not provided. As shown, since three wavelengths $\lambda 1, \lambda 1'$ and $\lambda 1''$ pass through the optical amplifier 14-1 and are amplified, competition of these wavelengths invites instable oscillation of the target wavelength $\lambda 1$.

FIG. 4(4) shows transparent characteristics of the optical BPF 22. FIG. 4(5) shows wavelength characteristics of light passing through the optical amplifier 14-1 when the optical BPF 22 is provided. Since the optical BPF 22 permits the basic waves ($\lambda 1$ to $\lambda 32$) alone to circulate in the loop, wavelength $\lambda 1$ alone, here, can enter the optical amplifier 14-1 and is amplified there.

In this manner, in the embodiment shown in FIG. 3, wavelengths other than basic waves (wavelengths $\lambda 1$ through $\lambda 32$) are removed by the optical BPF 22, and do not circulate in the loop. Therefore, even if the wavelength demultiplexing characteristics of the wavelength demultiplexing element 10 (and the wavelength multiplexing element 12) are periodic such that it demultiplexes (or they demultiplex) wavelengths other than basic waves as well, and the optical amplifiers 14 can amplify these undesired waves sufficiently, stable multi-wavelength laser oscillation containing basic waves alone is ensured.

Wavelength intervals of wavelengths contained in output light extracted from the fiber couplers 16 and 24 are determined by wavelength selectivities of the wavelength demultiplexing element 10 and the wavelength multiplexing element 12. It is easy to design AWGs such that the wavelength intervals be 100 GHz (0.8 nm) or its integer multiple. Therefore, it is sufficiently possible to realize multi-wavelength oscillation with wavelength intervals of approximately 0.8 nm.

Figure 5:
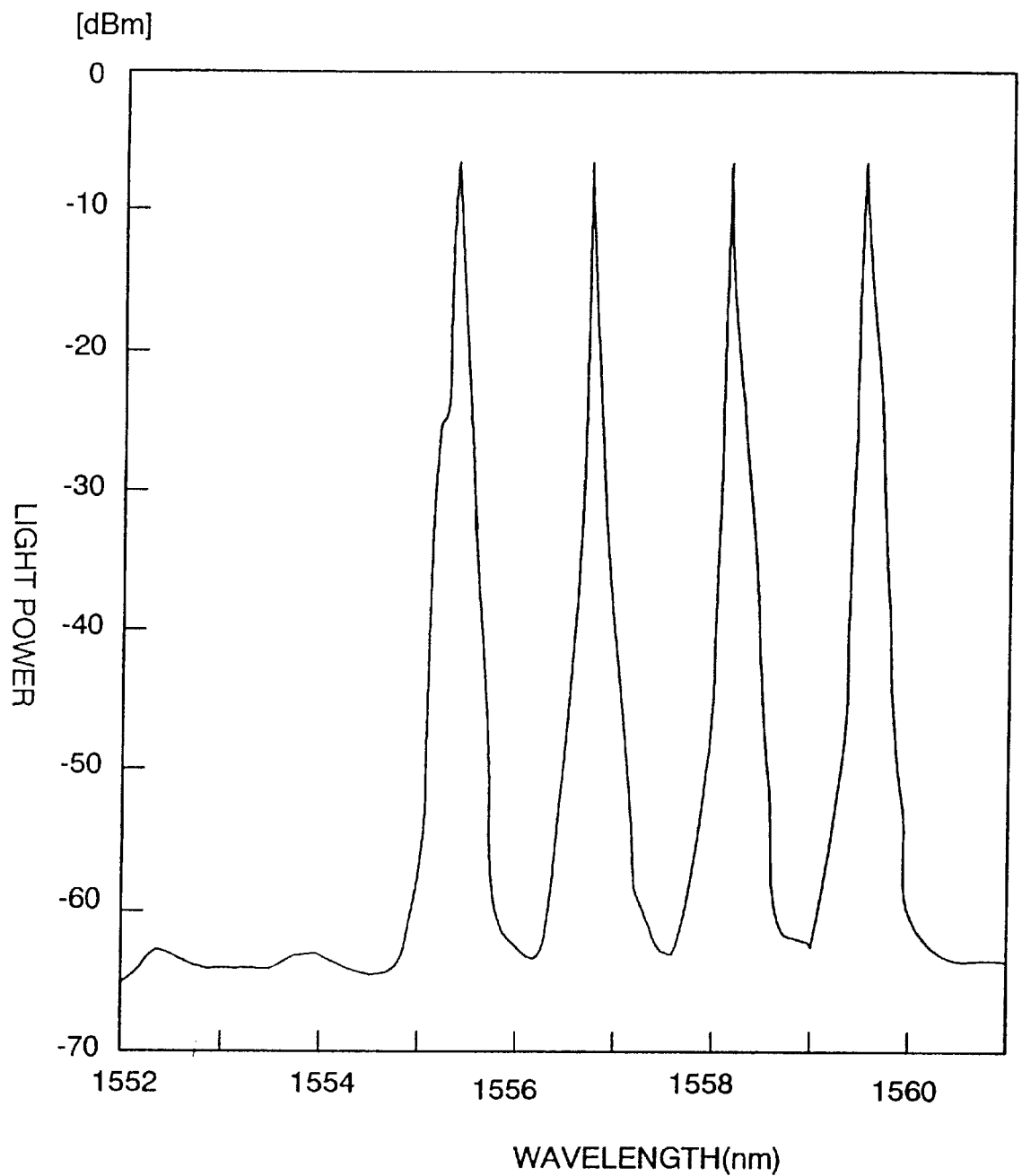
FIG. 5 shows a waveform obtained by an experiment.

FIG. 5 shows waveforms confirmed by an actual experiment. Used in the experiment are AWGs of wavelength intervals of 0.7 nm as the wavelength demultiplexing element 10 and the wavelength multiplexing element 12. Four ports in every other sequences are connected to counterpart ports having common numbers via optical amplifiers. It is known that four wavelengths in intervals of 1.4 nm are oscillated simultaneously in substantially the same optical intensity. The side mode suppression ratio was as good as 35 dB, and the ratio of the signal level to the background noise level was as good as approximately 60 dB.

A quartz AWG has a temperature coefficient of approximately 0.01 nm/° C. which is smaller by one digit than that of a semiconductor laser. Therefore, the accuracy for temperature control of two AWGs used as the wavelength demultiplexing element 10 and the wavelength multiplexing element 12 can be alleviated to 1/10 of the accuracy required for a signal-generating semiconductor laser for generating signal light used in wavelength multiplexing. Considering that the temperature controlling accuracy of the pumping light source of the optical amplifiers 14 (for example, a semiconductor laser for a wavelength around 1.48 nm) need not be so high as that required for a signal-generating semiconductor laser, temperature control of the pumping light source can be simplified. That is, this embodiment makes the entire temperature control easier and simpler, and can be manufactured economically.

This embodiment also makes it easy to adjust and modify wavelengths in output light because, by selecting appropriate temperatures of AWGs used as the wavelength demultiplexing element 10 and the wavelength multiplexing element 12, λ1 to λ32 can be shifted to longer or shorter wavelengths while maintaining the same wavelength intervals.

Figure 6:
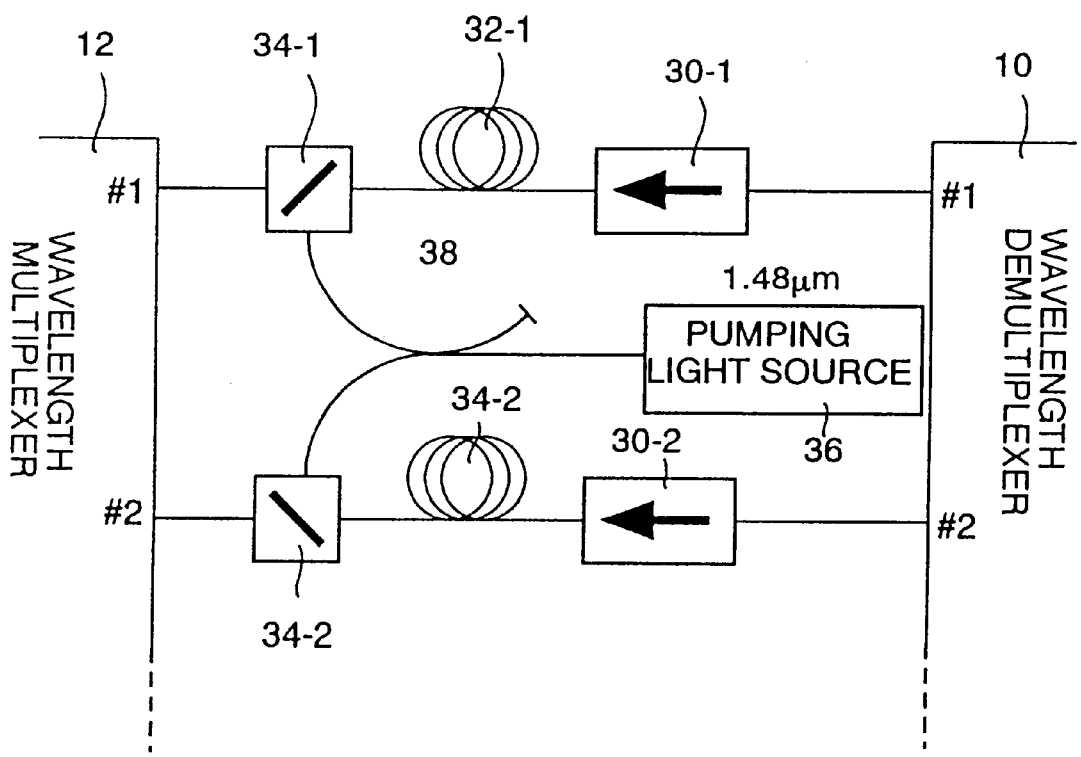
FIG. 6 is a schematic block diagram showing a general construction of a version commonly using two optical amplifiers 14-1 and 14-2.

In most cases, the optical amplifiers 14 have their own pumping light sources. However, erbium-doped optical fibers of a plurality of optical amplifiers can be pumped by a single pumping light source. FIG. 6 is a schematic block diagram showing a general construction of the modified part of a modified embodiment in this respect. Parts or elements common to those of FIG. 1 are labelled with common reference numerals. output port #1 of the wavelength demultiplexing element 10 is connected to input port #1 of the wavelength multiplexing element 12 via an optical isolator 30-1, erbium doped optical fiber 32-1 and wavelength demultiplex/multiplexing (WDM) coupler 34-1. Similarly, output port #2 of the wavelength demultiplexing element 10 is connected to input port #2 of the wavelength multiplexing element 12 via an optical isolator 30-2, erbium-doped optical fiber 32-2 and wavelength demultiplex/multiplexing coupler 34-2.

Output light of a 1.48 µm pumping semiconductor laser 36 is divided into two parts by a 3 dB coupler 38, and one of them is supplied to the erbium-doped optical fiber 32-1 via the WDM coupler 34-1 while the other is supplied to the erbium-doped optical fiber 32-2 via the WDM coupler 34-2. The optical isolators 30-1, 30-2 prevent that pumping light to the erbium-doped optical fibers 32-1, 32-2 enter the output ports #1 and #2 of the wavelength demultiplexing element 10.

In this manner, the optical amplifiers 14-1 and 14-2 can share a single pumping light source. By using this arrangement also for other optical amplifiers 14-3 through 14-32, the total number of pumping light sources can be reduced to a half.

Figure 7:
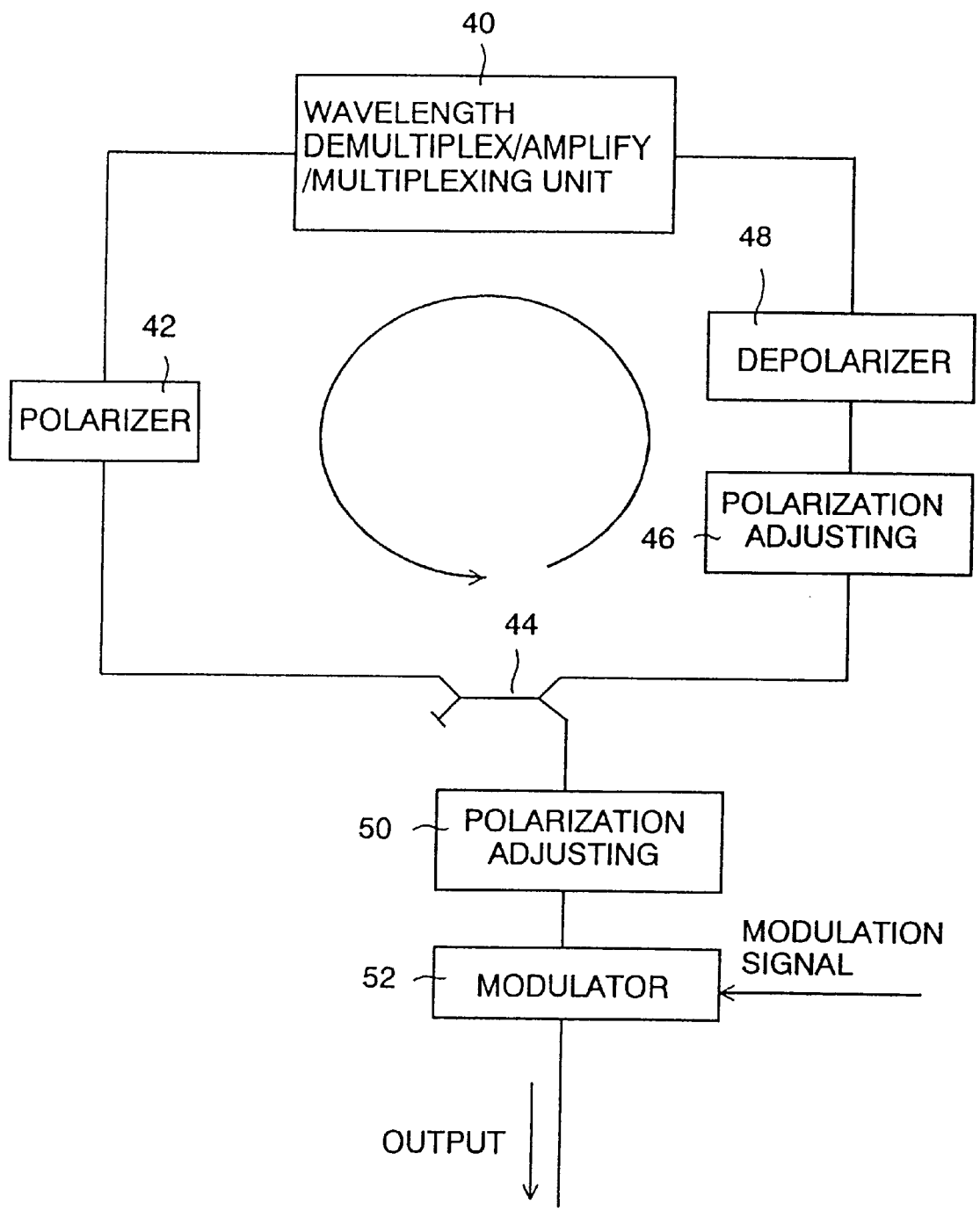
FIG. 7 is a schematic block diagram showing a general construction of an embodiment configured to modulate multi-wavelength light collectively.

It is convenient to use light containing collectively modified multiple wavelengths in transmission tests of wavelength division multiplex optical transmission systems. Explained below is an embodiment in which multi-wavelength light is modified collectively. FIG. 7 is a schematic block diagram of its general construction. Numeral 40 denotes a wavelength demultiplex/amplify/multiplexing unit containing the wavelength demultiplexing element 10, optical amplifiers 14 and wavelength multiplexing element 12 of FIG. 1 (and optical BPF 22 of FIG. 3). Output light of the unit 40 enters in a fiber coupler 44 via a polarizer 42. One of outputs of the fiber coupler 44 is fed to the wavelength demultiplex/amplify/multiplexing unit 40 through a polarization adjuster 46 and a depolarizer 48. The other output of the fiber coupler 44 enters into the external optical modulator 52 through a polarization adjuster 50.

In a fiber ring or loop formed by the wavelength demultiplex/amplify/multiplexing unit 40, polarizer 42, fiber coupler 44, polarization adjuster 46 and depolarizer 48, laser oscillation of multiple wavelengths occur simultaneously in substantially the same intensity in the same manner as the embodiment shown in FIG. 1. The multi-wavelength light is extracted from the fiber ring by the fiber coupler 50.

Also in the wavelength demultiplex/amplify/multiplexing unit 40, the composite transparent wavelength characteristics of the wavelength demultiplexing and the wavelength multiplexing are chosen to sufficiently narrow the transparent wavelength widths for individual wavelengths so that longitudinal modes can be decreased to a few or only one. As explained with reference to FIG. 1, this is attained by narrowing the transparent wavelength width of each wavelength in the transparent wavelength characteristics of each of the wavelength demultiplexing element and the wavelength multiplexing element, or by slightly shifting the transparent wavelength characteristics of the wavelength demultiplexing element from those of the wavelength multiplexing element.

The use of the polarizer 42 contributes to suppression of polarization fluctuations in the fiber ring. In order to prevent interference in the wavelength demultiplex/amplify/multiplexing unit 40, the depolarizer 48 depolarizes the input light. If the polarized condition by the polarizer 42 is maintained, interference or other undesirable effects may occur in the external modulator 52. To remove such trouble in the external modulator 52, the polarization adjuster 50 adjusts the polarization. Additionally, for more effective depolarization by the depolarizer 48, the polarization adjuster 46 adjusts polarization of the input light.

While light circulates in the fiber ring made of the wavelength demultiplex/amplify/multiplexing unit 40, polarizer 42, fiber coupler 44, polarization adjuster 46 and depolarizer 48, simultaneous laser oscillation in multiple wavelengths occurs in the same manner as the embodiment of FIG. 1. The multi-wavelength light by the simultaneous laser oscillation is extracted by the fiber coupler 44, and applied to the external modulator 52 via the polarization adjuster 50. The external optical modulator 52 modulates the applied multi-wavelength light collectively in accordance with an externally applied modulation signal. The modulated light is supplied to transmission optical fibers, etc.

Polarization fluctuation in the fiber ring causes fluctuation of the ring cavity mode, and makes simultaneous oscillation of multiple wavelengths instable. In the embodiment, however, since the polarizer 42 suppresses fluctuations in planes of polarization, instable oscillation can be suppressed. If, however, the wavelength demultiplex/amplify/multiplexing unit 40 (wavelength demultiplexing element 10, wavelength multiplexing element 12 and optical amplifiers 14) and the fiber coupler 16 are of a polarization holding type, the polarizer 42, depolarizer 48 and polarization adjusters 46, 50 may be omitted.

Also in the embodiment shown in FIG. 7, if looping of light of undesired wavelengths outside the target wavelength band should be previously prevented, an optical BPF similar to the optical BPF 22 in the embodiment shown in FIG. 3 is placed at a desired location in the fiber ring (inside or outside the wavelength demultiplex/amplify/multiplexing unit 20).

Figure 8:
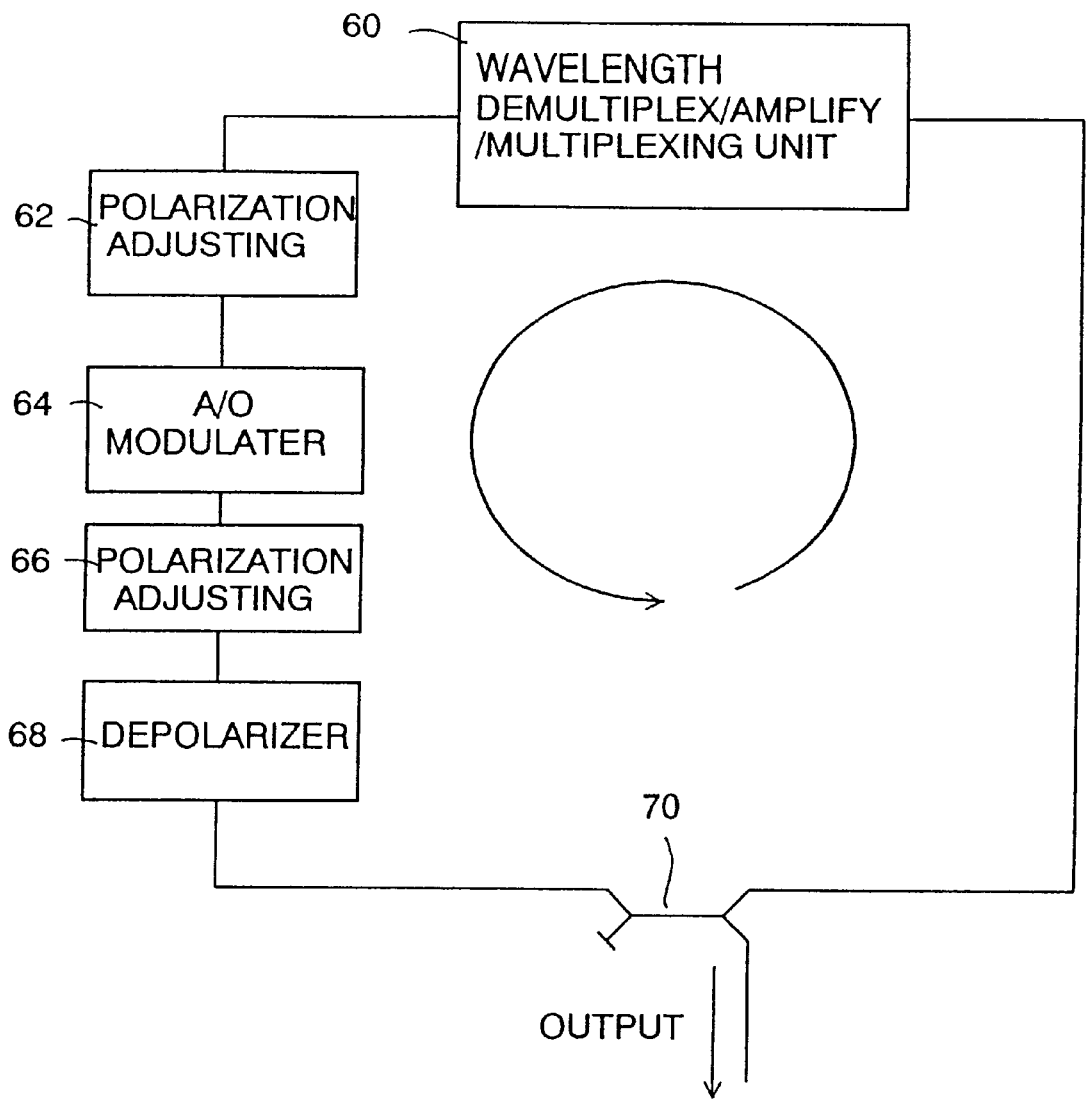
FIG. 8 is a schematic block diagram showing a general construction of an embodiment of the invention applied to a multi-wavelength ASE light source.

To test characteristics of optical components, it is desirable to use an ASE (Amplified Spontaneous Emission) light source for multiple wavelengths, which does not laser-oscillate. Such a multi-wavelength ASE light source can be readily obtained according to the invention. FIG. 8 is a schematic block diagram showing a general construction of an embodiment taken for this purpose.

Explained below is the construction of the embodiment of FIG. 8. Numeral 60 denotes a wavelength demultiplex/amplify/multiplexing unit similar to the wavelength demultiplex/amplify/multiplexing unit 40. Output light from the unit 60 enters in an acousto-optic modulator 64 via a polarization adjuster 62. Output of an A/O modulator 64 enters in a fiber coupler 70 via a polarization adjuster 66 and a depolarizer 68. One of outputs of the fiber coupler 70 enters in the wavelength demultiplex/amplify/multiplexing unit 60, and the other output of the fiber coupler 70 is extracted as multi-wavelength ASE light.

The A/O modulator 64 slightly shifts and outputs wavelengths in the input light. Therefore, light circulating in the fiber ring made of the wavelength demultiplex/amplify/multiplexing unit 60, polarization adjuster 62, A/O modulator 64, polarization adjuster 66, depolarizer 68 and fiber coupler 70 is slightly shifted in wavelength by the A/O modulator 64. As a result, laser oscillation does not occur, and amplified spontaneous emission light, that is, ASE light is obtained. Since the multi-wavelength state is not lost even after passing the A/O modulator 64, the light extracted from the fiber coupler 70 is ASE light containing multiple wavelengths.

In order to prevent interference or other undesired events in the A/O modulator 64, the polarization adjuster adjusts polarization of input light to the A/O modulator 64. If the output light of the A/O modulator 64 remains in a specific polarized state, undesirable effects may occur in the wavelength demultiplex/amplify/multiplexing unit 60. To deal with the matter, the polarization adjuster 66 and depolarizer 68 previously cancel the specific polarized state. The polarization adjuster 66 and the depolarizer 68 may be located between the fiber coupler 70 and the wavelength demultiplex/amplify/multiplexing unit 60. However, as shown in FIG. 8, when they are located between the A/O modulator 64 and the fiber coupler 70, polarization dependency is removed from multi-wavelength ASE light extracted from the fiber coupler 70, and this light can be used more conveniently for examining various characteristics (such as amplification characteristics or loss characteristics) of optical components to wavelength-division multiplexed light.

In the embodiment shown in FIG. 7, multi-wavelength light is modified collectively. However, it is preferable that individual wavelengths can be data-modulated independently for use in actual transmission tests or transmission.

Figure 9:
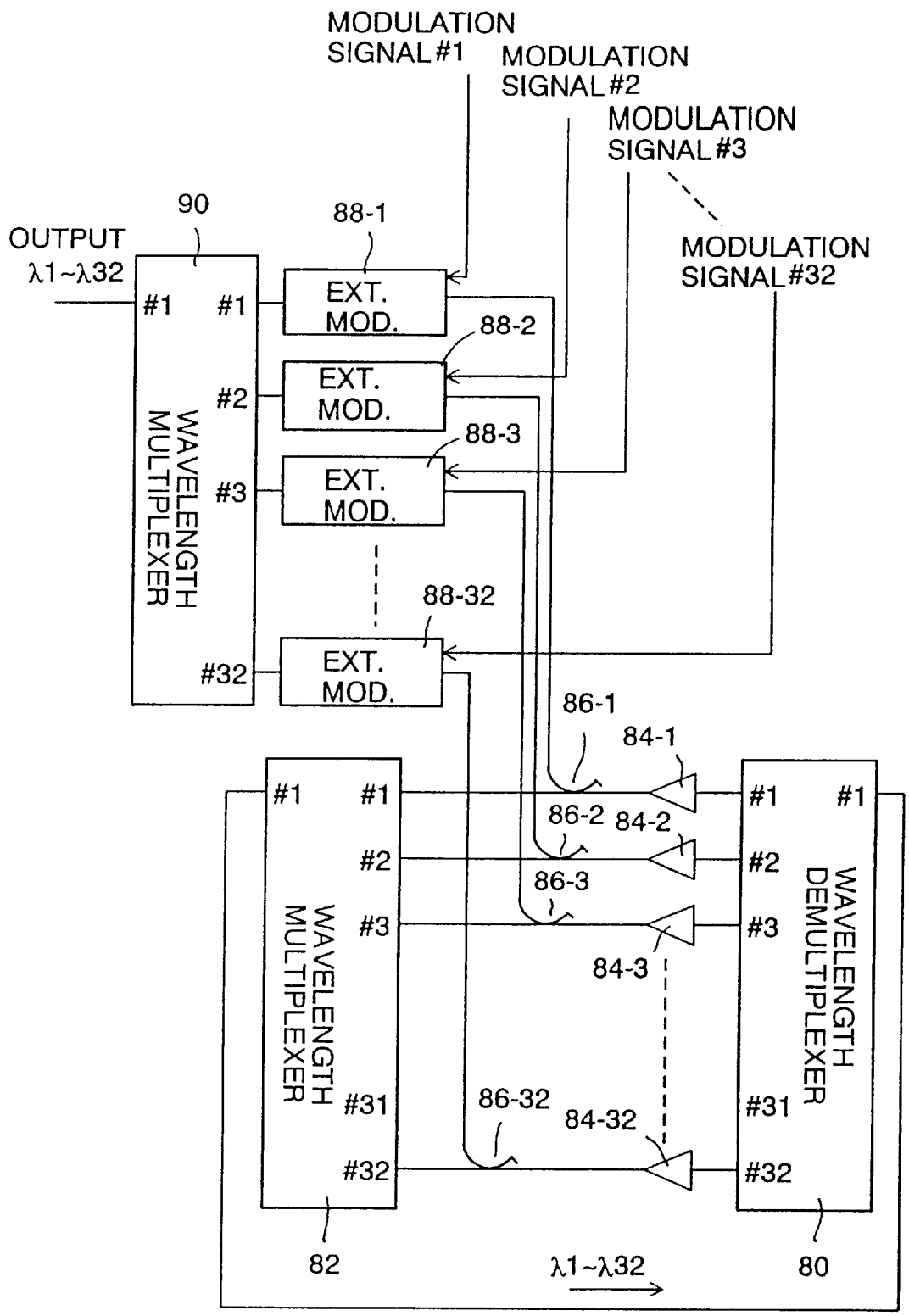
FIG. 9 is a schematic block diagram showing a general construction of an embodiment configured to modulate each wavelength component individually.

FIG. 9 is a schematic block diagram showing a general construction of an embodiment configured to modify respective wavelengths individually. Numeral 80 denotes a wavelength demultiplexing element similar to the wavelength demultiplexing element 10, and 82 denotes a wavelength multiplexing element similar to the wavelength multiplexing element 12. Output ports of the wavelength demultiplexing element 80 are connected to common-numbered input ports of the wavelength multiplexing element 82 through optical amplifiers 84 (84-1 through 84-32) similar to the optical amplifiers 14. Wavelength multiplex output of the wavelength multiplexing element 82 is connected to the input of the wavelength demultiplexing element 80. Here again, if necessary, an optical BPF similar to the optical BPF 22 used in the embodiment of FIG. 3 may be provided, for example, between the output of the wavelength multiplexing element 82 and the input of the wavelength demultiplexing element 80.

Since this embodiment does not take out multi-wavelength light directly, it does not use a fiber coupler similar to the fiber coupler 16. Instead, fiber couplers 86 (86-1 through 86-32) are provided for dividing outputs of the optical amplifiers 84-1 through 84-32. Optical outputs extracted by the fiber couplers 86-1 to 86-32 are applied to external modulators 88 (88-1 through 88-32). The external modulators 88 (88-1 through 88-32) are supplied with different modulation signals #1 through #32. Optical outputs from the external modulators 88-1 through 88-32 are applied to a wavelength multiplexing element 90 which is identical to the wavelength multiplexing element 82.

The wavelength demultiplexing element 80, wavelength multiplexing element 82, optical amplifiers 84 and fiber coupler 86 are of a polarization holding type. If not, additional elements corresponding to the polarizer 42, polarization adjuster 46 and depolarizer 48 used in the embodiment of FIG. 7 must be provided in the loop made of the wavelength demultiplexing element 80, optical amplifiers 84 and wavelength multiplexing element 82.

Composite transparent wavelength characteristics of the wavelength demultiplexing element 80 and the wavelength multiplexing element 82 are chosen to sufficiently narrow the transparent wavelength widths for individual wavelengths so that longitudinal modes can be decreased to a few or only one. As explained with reference to FIG. 1, this is attained by narrowing the transparent wavelength width for each wavelength of the transparent wavelength characteristics of each of the wavelength demultiplexing element 80 and the wavelength multiplexing element 82, or by slightly shifting the transparent wavelength characteristics of the wavelength demultiplexing element 80 from those of the wavelength multiplexing element 82.

Explained below are behaviors of the embodiment shown in FIG. 9. In the loop made of the wavelength demultiplexing element 80, optical amplifiers 84 and wavelength multiplexing element 82, laser oscillation of multiple wavelengths occur simultaneously in substantially the same intensity in the same manner as the embodiment shown in FIG. 1. Respective wave-lengths by laser oscillation are taken out individually by the fiber couplers 86-1 through 86-3, and applied to the external modulators 88-1 through 88-32. External modulators 88-1 and 88-25 modulate their optical inputs by modulation signals #1 to #32, respectively. As a result, modulated optical outputs containing different wavelengths modulated by different modulation signals #1 to #32 can be obtained. Then, the wavelength multiplexing element 90 wavelength-multiplexes the outputs of the external modulators 88-1 through 88-32, and supplies the multiplexed light to an external element such as optical fiber transmission path, for example. Thus, the transmission test can be executed in practical conditions for transmission.

It is essential for the wavelength multiplexing element 90 only to compose or multiplex optical outputs of the external modulators 88-1 through 88-32, and it need not have the same wavelength multiplexing function as that of the wavelength multiplexing element 82.

Figure 10:
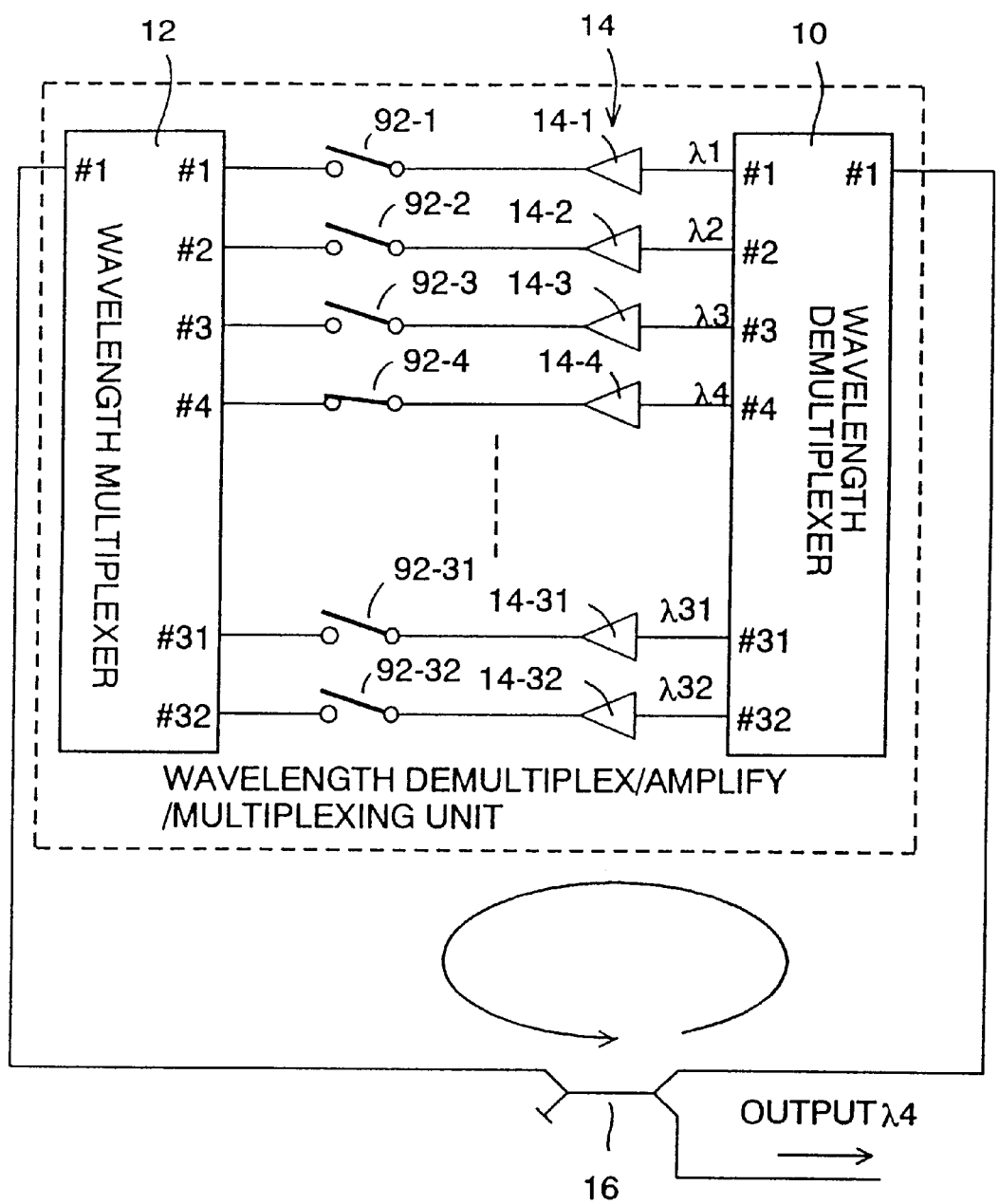
FIG. 10 is a schematic block diagram showing a general construction of an embodiment configured to extract one or more desired wavelengths among a plurality of wavelengths in given wavelength intervals.

In some applications, it is desired to take out one or some wavelengths from a number of wavelengths in certain wavelength intervals. Such requirement is attained by modifying the embodiment of FIG. 1 in the manner as shown in FIG. 10. That is, optical switches 92 (92-1 through 92-32) are inserted between outputs of optical amplifiers 14-1 through 14-32 and input ports of the wavelength multiplexing element 12. When one or more of the optical switches 92-1 through 92-32 are turned on, corresponding wavelengths alone circulate in the fiber ring, and laser oscillated outputs with corresponding wavelengths are taken out from the fiber coupler 16. For example, when only the optical switch 92-4 is turned on, only the wavelength $\lambda 4$ stimulates laser oscillation, and the laser light is taken out from the fiber coupler 16. If optical switches in every two intervals are turned on among optical switches 92-1 through 92-32, then multi-wavelength light containing wavelengths in wavelength interval twice that of the wavelength demultiplexing element 10 (and the wavelength multiplexing element 12) can be obtained.

In the same manner as the embodiment shown in FIG. 3, which is a modified version of the embodiment of FIG. 1, an optical BPF similar to the optical BPF 22 in the embodiment of FIG. 3 may be provided, if necessary.

According to the embodiment shown in FIG. 10, light containing only one or some of a plurality of predetermined wavelengths can be obtained. That is, this light source can be operated as a discrete-wavelength-variable light source or as a multi-wavelength light source capable of selecting any desired wavelength interval.

The modification in the embodiment shown in FIG. 10 is applicable also to embodiments shown in FIGS. 7, 8 and 9.

Figure 11:
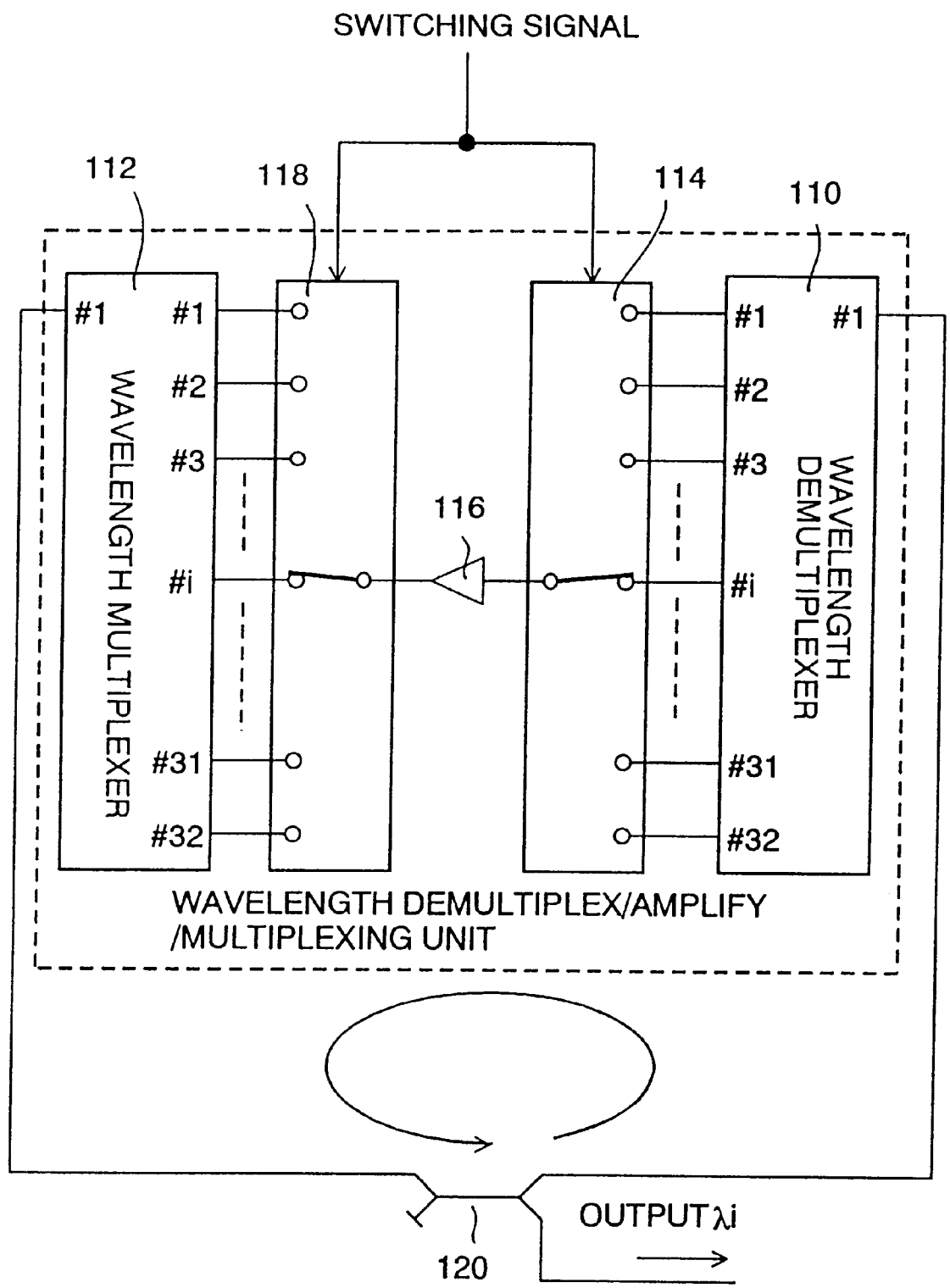
FIG. 11 is a schematic block diagram showing a general construction of an embodiment applied to a wavelength-variable light source for outputting a single discrete wavelength.

FIG. 11 is a schematic block diagram showing a general construction of an embodiment realizing a wavelength-variable light source for a discrete single wavelength. Numeral 110 denotes a wavelength demultiplexing element similar to the wavelength demultiplexing element 10, and 112 denotes a wavelength multiplexing element similar to the wavelength multiplexing element 12. 114 designates a 32×1 optical switch for selecting one of plural output ports (32 output ports in this embodiment) of the wavelength demultiplexing element 110. 116 denotes an optical amplifier for amplifying output light from the optical switch 114. 118 denotes a 1×32 optical switch for switching an output of the optical amplifier 116 to one of plural input ports (32 input ports in this embodiment) of the wavelength multiplexing element 112.

Optical switches 114, 118 can be turned ON and OFF by using a common switching signal. That is, optical switches 114, 118 select an output port and an input port with a common number among plural output ports of the wavelength demultiplexing element 110 and plural input ports of the wavelength multiplexing element 112.

Since the optical amplifier 116 amplifies one of wavelengths λ1 through λ32 demultiplexed by the wavelength demultiplexing element 110, its amplification band is wide enough to cover wavelengths λ1 through λ32 and need not be wider. No problem of FSR occurs.

Explained below are behaviors of the embodiment shown in FIG. 11. Among wavelengths λ1 through λ32 demultiplexed by the wavelength demultiplexing element 110, a wavelength selected by the optical switch 114 is amplified by the optical amplifier 116. Output of the optical amplifier 116 enters in one of input ports of the wavelength multiplexing element 112, having a number common to the output port selected by the optical switch 114. Therefore, the wavelength multiplexing element 112 outputs light amplified by the optical amplifier 116 from its output port to the fiber coupler 120. The fiber coupler 120 divides the light from the wavelength multiplexing element 112 into two components, and supplies one to the wavelength demultiplexing element 110 and externally outputs the other as output light.

The light of the wavelength selected by the optical switches 114, 118 circulates in the fiber ring made of the wavelength demultiplexing element 110, optical switch 114, optical amplifier 116, optical switch 118, wavelength multiplexing element 112 and fiber coupler 120, and stimulates laser oscillation.

Figure 12:
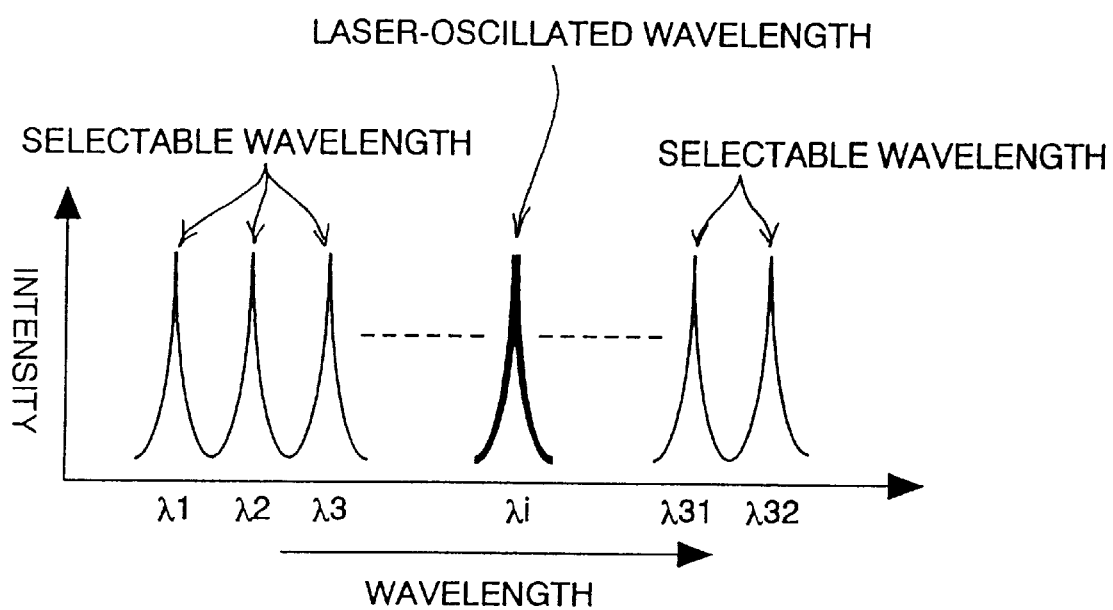
FIG. 12 shows distribution of wavelengths in output of the embodiment shown in FIG. 11.

FIG. 12 shows an example of wavelength distribution in output of the embodiment shown in FIG. 11. In this example, an output port #i of the wavelength demultiplexing element 110 and an input port #i of the wavelength multiplexing element 112, which correspond to wavelength λi, are selected by the optical switches 114, 118. In FIG. 12, the actually laser-oscillated wavelength is shown by the bold solid line, and wavelengths that can be selected are shown by the thin solid line.

If a sufficient wavelength selectivity is ensured only with the wavelength demultiplexing element 110, the system may omit the wavelength multiplexing element 112 and hence the optical switch 118.

Figure 13:
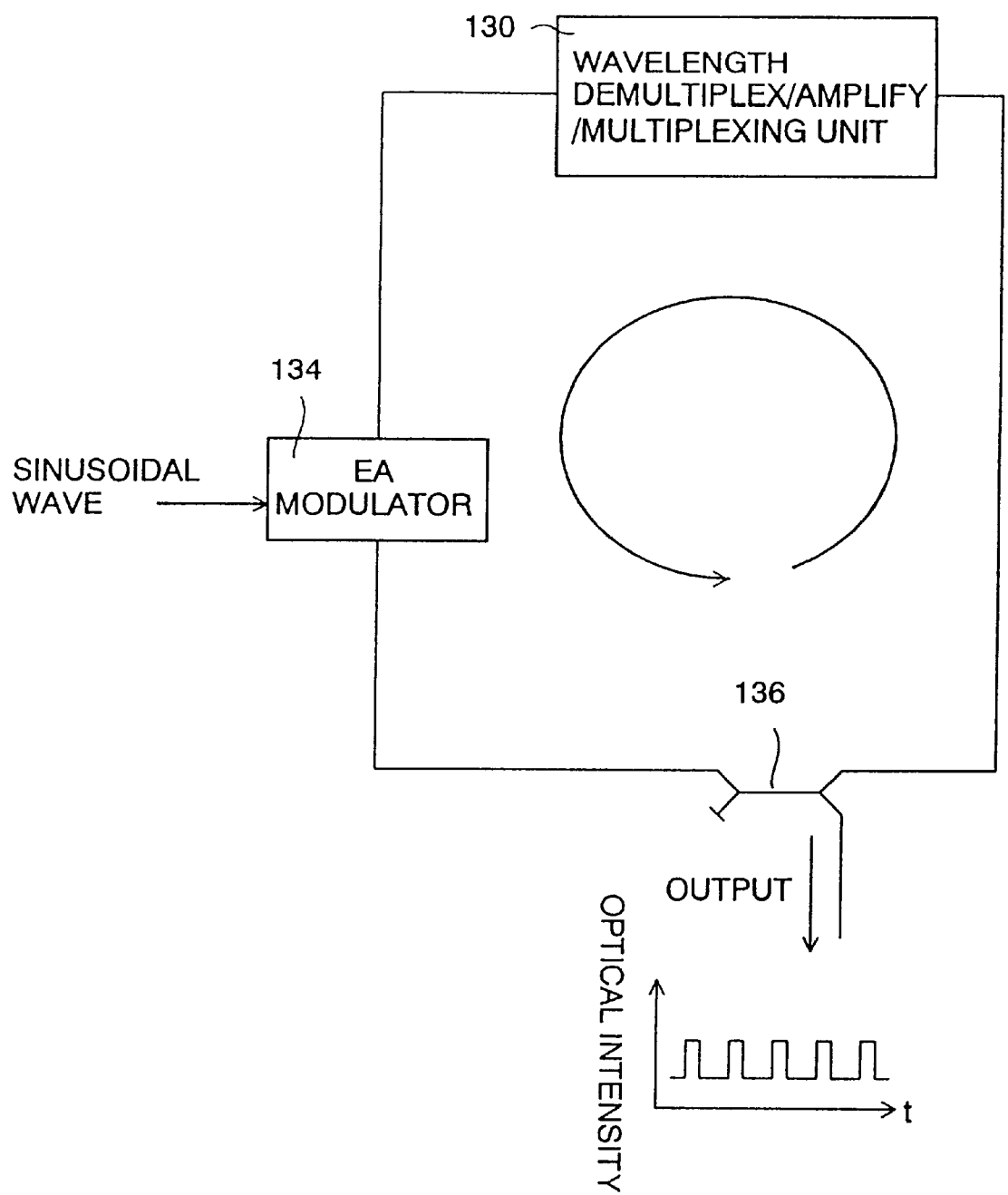
FIG. 13 is a schematic block diagram showing a general construction of an embodiment applied to a multi-wavelength mode lock pulse light source.

FIG. 13 is a schematic block diagram showing a general construction of a multi-wavelength mode-locked pulse light source taken as another embodiment of the invention. In a pulse light source, it is desirable that the pulse phase is stable on the time domain. In this embodiment, mode-locked pulse light for plural wavelengths can be obtained collectively.

Numeral 130 denotes a wavelength demultiplex/amplify/multiplexing unit comprising the wavelength demultiplexing element 10, optical amplifiers 14 and wavelength multiplexing element 12, all of FIG. 1, wavelength demultiplexing element 10, optical amplifiers 14-1 through 14-32, optical switches 92-1 through 92-32 and wavelength multiplexing element 12, all of FIG. 10, or wavelength demultiplexing element 110, optical switch 114, optical amplifier 116, optical switch 118 and wavelength multiplexing element 112, all of FIG. 11. When the wavelength demultiplex/amplify/multiplexing unit 120 comprises the wavelength demultiplexing element 10, optical amplifiers 14 and wavelength multiplexing element 12 of FIG. 1, laser oscillation occurs simultaneously in multiple wavelengths. When the unit 120 comprises the wavelength demultiplexing element 10, optical amplifiers 14-1 through 14-32, optical switches 92-1 through 92-32 and wavelength multiplexing element 12 of FIG. 10, or the wavelength demultiplexing element 110, optical switch 114, optical amplifier 116, optical switch 118 and wavelength multiplexing element 112, laser oscillation occurs in selected one or some wavelengths.

Numeral 134 denotes an electroabsorption optical modulator for modulating output light of the wavelength demultiplex/amplify/multiplexing unit by a sinusoidal modulation signal, and 136 denotes a fiber coupler for dividing output light of the electroabsorption optical modulator 134 into two parts to supply one to the wavelength demultiplex/amplify/multiplexing unit 130 and to externally output the other as output light.

When L is the ring length of the ring or loop made of the wavelength demultiplex/amplify/multiplexing unit 130, electroabsorption optical modulator 134, and fiber coupler 136, n is the effective refractive index, and c is the light velocity, a sinusoidal voltage of a frequency corresponding to an integer multiple of the basic frequency fo=c/(nL) is applied as a modulation signal to the electroabsorption optical modulator 134. Transparent band widths of the wavelength demultiplexing element (and wavelength multiplexing element) in the wavelength demultiplex/amplify/multiplexing unit 130 for respective wavelengths are determined to be sufficiently narrower than the circulating basic frequency fo.

Under these conditions of frequency, light circulating in the fiber ring or loop made of the wavelength demultiplex/amplify/multiplexing unit 130, electroabsorption optical modulator 134 and fiber coupler 136 is mode-locked to the sinusoidal modification signal applied to the electroabsorption optical modulator 134, and has the form of a pulse rising at an apex or nadir of the sinusoidal modulation signal. As a result, a sequence of pulses containing multiple wavelengths and mode-locked can be obtained.

Since the ring length L and the effective refractive index n vary for different wavelengths, it is necessary, in a strict sense, to adjust effective optical path lengths for individual wavelengths in the wavelength demultiplex/amplify/multiplexing unit 130. However, it is sufficient to connect an electroabsorption optical modulator (and, if necessarily, a polarization adjuster) in a location anterior to the optical path for each wavelength, more preferably, anterior to the optical amplifier 14, in the wavelength demultiplex/amplify/multiplexing unit 130 and to apply a sinusoidal modulation signal in corresponding phase and frequency to the electroabsorption optical modulator to modulate it there. Then, the phase and frequency of one sinusoidal signal may be adjusted independently, and may be applied as a modulation signal to each electroabsorption optical modulator. In this case, however, A number of electroabsorption optical modulators (and polarization adjusters) corresponding to respective wavelengths are needed and the light source becomes more expensive than the embodiment of FIG. 13.

In the embodiment of FIG. 13, when looping of undesired wavelengths other than the target wavelengths should be prevented, an optical BPF similar to the optical BPF 22 in the embodiment shown in FIG. 3 is provided at an appropriate location, for example, between the output of the wavelength demultiplex/amplify/multiplexing unit 130 and the optical modulator 134.

Figure 14:
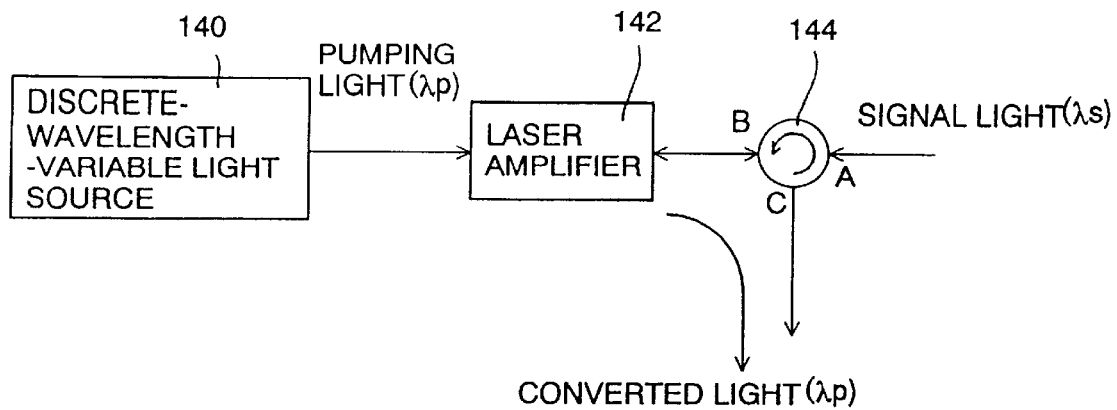
FIG. 14 is a schematic block diagram showing a general construction of a wavelength converting apparatus using the wavelength-variable light source shown in FIGS. 10 and 12 as its pump light source.
Figure 15:
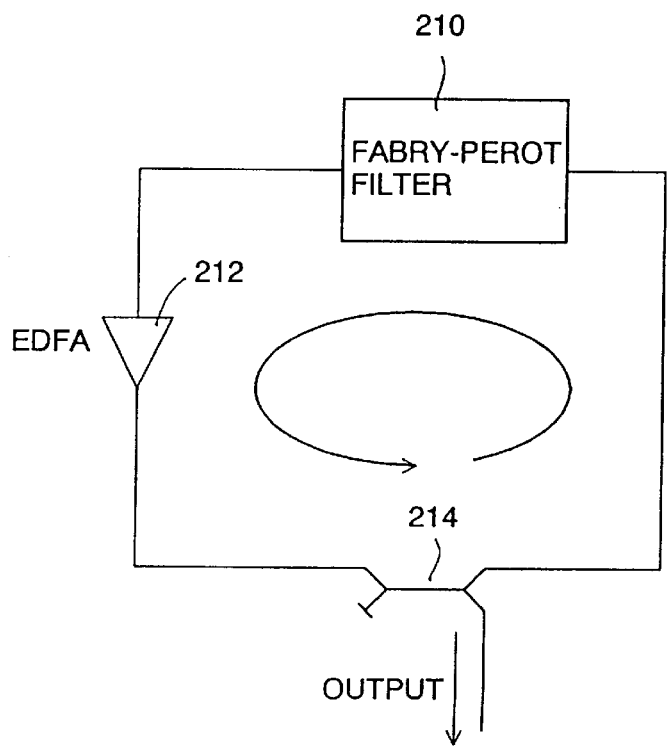
FIG. 15 is a schematic block diagram showing a general construction of a conventional multi-wavelength light source.

By using the wavelength variable light source according to the embodiment shown in FIG. 10 or FIG. 11 as a pump light source of a wavelength converting apparatus, any wavelength acceptable in a network can be used efficiently. FIG. 14 is a schematic block diagram of a general construction of an embodient taken for this purpose.

In FIG. 14, numeral 140 denotes a wavelength variable light source shown in FIG. 10 or FIG. 11, which is designed and fabricated so that wavelengths acceptable in a wavelength-division multiplexing optical network can be selected. Output light from the wavelength variable light source is applied as pumping light $\lambda p$ to a semiconductor laser amplifier 142. On the other hand, input modified light $\lambda s$ enters into a terminal A of an optical circulator 144. The optical circulator 144 is an optical element which outputs the light entering through the terminal A from another terminal B and outputs the light entering through the terminal B from a terminal C. Output light from the terminal B of the optical circulator 144 (modulated light $\lambda s$) is fed to an end surface of the semiconductor laser amplifier 142 opposite from the end surface into which the pumping light $\lambda p$ is entered.

The pumping light $\lambda p$ and the modulated light $\lambda s$ travel in opposite direction within the semiconductor laser amplifier 142. If the intensity of the pump light $\lambda p$ is held at a value where the gain of the semiconductor laser amplifier 142 is saturated, the pumping light $\lambda p$ is waveform-modified in accordance with the intensity waveform of the modulated light $\lambda s$ due to their mutual gain modulation effect. That is, waveform of the pumping light $\lambda p$ becomes substantially opposite from the waveform of the modulated light $\lambda s$. The waveform-modified pumping light $\lambda p$ enters into the optical circulator 144 through the terminal B, and it is output from the terminal C. The light output from the terminal C of the optical circulator 144 has a form in which the input modulated light $\lambda s$ has been wavelength-converted to the wavelength of the pump light $\lambda p$.

In the discrete-wavelength-variable light source 140 to which the invention is applied, its available wavelengths can be readily set to coincide with wavelengths acceptable in the wavelength-division multiplexing optical network. Once the wavelengths are set so, the wavelength of the optical signal obtained by wavelength conversion of the input modified signal $\lambda s$ is an acceptable wavelength of the network, and the acceptable wavelength in the network can be re-used. When a light source capable of varying continuous wavelengths, such as conventional multi-electrode semiconductor laser, for example, is used as the wavelength variable light source 140, precisely accurate control must be made to adjust the wavelength of its output light to one of wavelengths acceptable in the network, and this invites a much complicated construction and a high cost. In contrast, according to the invention, the discrete-wavelength-variable light source can select an appropriate wavelength through the switch, and can remove the need for wavelength control and severe accuracy therefor.

In addition to the foregoing examples, there are arrangements for four-wave-mixing, for example, as wavelength converting mechanisms, and a fiber amplifier is also usable in lieu of the semiconductor laser amplifier and the arrangement using an absorption-type optical modulator is disclosed in a patent application by the same Applicant, entitled Waveform Converting Apparatus, (Japanese Patent Application Heisei 8-233796).

As readily understandable from the above explanation, according to the invention, laser output containing multiple wavelengths with substantially uniform intensity can be obtained. By using as wavelength demultiplexing means an element for wavelength-demultiplexing input light into multiple wavelengths in predetermined wavelength intervals, a multi-wavelength light source for generating light containing multiple wavelengths in certain intervals can be realized. Since the light source has a simple structure and is mostly of passive elements, it is stable against changes in temperature.

By intensity-modifying circulating light in an optical loop with a modification signal having an integer multiple frequency of the circular frequency of the optical loop, multi-wavelength pulse light locked with the modulation signal can be obtained.

By locating means posterior to wavelength division (preferably, posterior to optical amplification) for selectively supplying light to or blocking light from wavelength multiplexing means, multiplex output light containing any selected one or more wavelengths can be obtained.

According to the invention, it is also easy to modify multi-wavelength laser light either collectively or individually.

When wavelength shifting means is placed in an optical loop, an ASE light source for multiple wavelengths can be realized.

When the output of selectively demultiplexing and amplifying means for selectively demultiplexing a predetermined wavelength from input light and amplifying the demultiplexed light is connected to input of the same means so as to form an optical loop, one of a plurality of discrete wavelengths can be used as output light. That is, one of discrete wavelengths can be selected. Since the wavelength is selected from predetermined wavelengths, output containing stable wavelengths can be obtained.

What is claimed is:

1. A multi-wavelength light source for outputting laser light having a plurality of collectively modified wavelength comprising:

wavelength demultiplex/amplify/multiplexing means for demultiplexing input light into a plurality of predetermined different wavelengths, individually optical amplifying each of the different wavelengths, and wavelength-multiplexing the different wavelengths;

polarizing means for extracting predetermined polarized components from output light of said wavelength demultiplex/amplify/multiplexing means;

light splitting means for splitting output light of said polarizing means;

depolarizing means for depolarizing one optical output of said light splitting means and applying it to the wavelength demultiplex/amplify/multiplexing means; and modulating means for modulating another optical output of said light splitting means in accordance with a modulation signal.

2. The multi-wavelength light source according to claim 1 further comprising polarization adjusting means located between said one optical output of said splitting means and input of said depolarizing means.

3. The multi-wavelength light source according to claim 1 further comprising polarization adjusting means located between said another output of said splitting means and input of said modulating means.

4. The multi-wavelength light source according to claim 1 wherein said wavelength demultiplex/amplify/multiplexing means comprises wavelength demultiplexing means for demultiplexing input light into predetermined different wavelengths in predetermined wavelength intervals, a plurality of optical amplifying means for individually amplifying said wavelengths demultiplexed by said wavelength demultiplexing means, and wavelength demultiplexed means for wavelength-multiplexing optical outputs from said optical amplifying means.

5. The multi-wavelength light source according to claim 4 wherein said wavelength demultiplexing means and said wave-length demultiplexing means are waveguide-type wavelength selecting filters.

* * * * *